United States Patent
Guerin et al.

(10) Patent No.: US 11,401,987 B2
(45) Date of Patent: Aug. 2, 2022

(54) CONTROL OF THE ENGAGEMENT RATE OF A CLUTCH

(71) Applicant: TRANSMISSION CVTCORP INC., Sainte-Julie (CA)

(72) Inventors: Jonathan Guerin, Sainte-Julie (CA); Jean-Francois Dionne, LaPrairie (CA); Daniel Girard, Saint-Mathieu-de-Beloeil (CA)

(73) Assignee: TRANSMISSION CVTCORP INC., Ste-Julie (CA)

( * ) Notice: Subject to any disclaimer, the term of this patent is extended or adjusted under 35 U.S.C. 154(b) by 0 days.

(21) Appl. No.: 17/250,045

(22) PCT Filed: May 17, 2019

(86) PCT No.: PCT/CA2019/050677
§ 371 (c)(1),
(2) Date: Nov. 12, 2020

(87) PCT Pub. No.: WO2019/222837
PCT Pub. Date: Nov. 28, 2019

(65) Prior Publication Data
US 2021/0215210 A1    Jul. 15, 2021

Related U.S. Application Data

(60) Provisional application No. 62/675,440, filed on May 23, 2018.

(51) Int. Cl.
*F16D 48/08*    (2006.01)

(52) U.S. Cl.
CPC .... *F16D 48/08* (2013.01); *F16D 2500/10412* (2013.01); *F16D 2500/30406* (2013.01); *F16D 2500/30415* (2013.01); *F16D 2500/30426* (2013.01); *F16D 2500/70408* (2013.01); *F16D 2500/70412* (2013.01)

(58) Field of Classification Search
None
See application file for complete search history.

(56) References Cited

U.S. PATENT DOCUMENTS

| | | | |
|---|---|---|---|
| 4,638,898 | A | 1/1987 | Braun |
| 4,905,801 | A | 3/1990 | Tezuka |
| 5,839,084 | A | 11/1998 | Takasaki et al. |
| 7,077,783 | B2 | 7/2006 | Senger et al. |
| 2007/0221427 | A1 | 9/2007 | Cimatti et al. |
| 2016/0167655 | A1 | 6/2016 | Minami |
| 2016/0332629 | A1 | 11/2016 | Dionne et al. |
| 2017/0138418 | A1 | 5/2017 | Cho et al. |

FOREIGN PATENT DOCUMENTS

| | | |
|---|---|---|
| DE | 102012210359 | 12/2013 |
| KR | 101694071 | 1/2017 |
| WO | 2015/014614 | 2/2015 |
| WO | 2016/193027 | 12/2016 |

*Primary Examiner* — Timothy Hannon
(74) *Attorney, Agent, or Firm* — Fay Kaplun & Marcin, LLP

(57) ABSTRACT

The control of the engagement rate of a clutch in a driveline is described herein. The clutch engagement rate is determined using at least one parameter of the driveline. An illustrative example where the parameters include the slipping level of the clutch and the rotational speed at the output of the clutch is described herein.

7 Claims, 4 Drawing Sheets

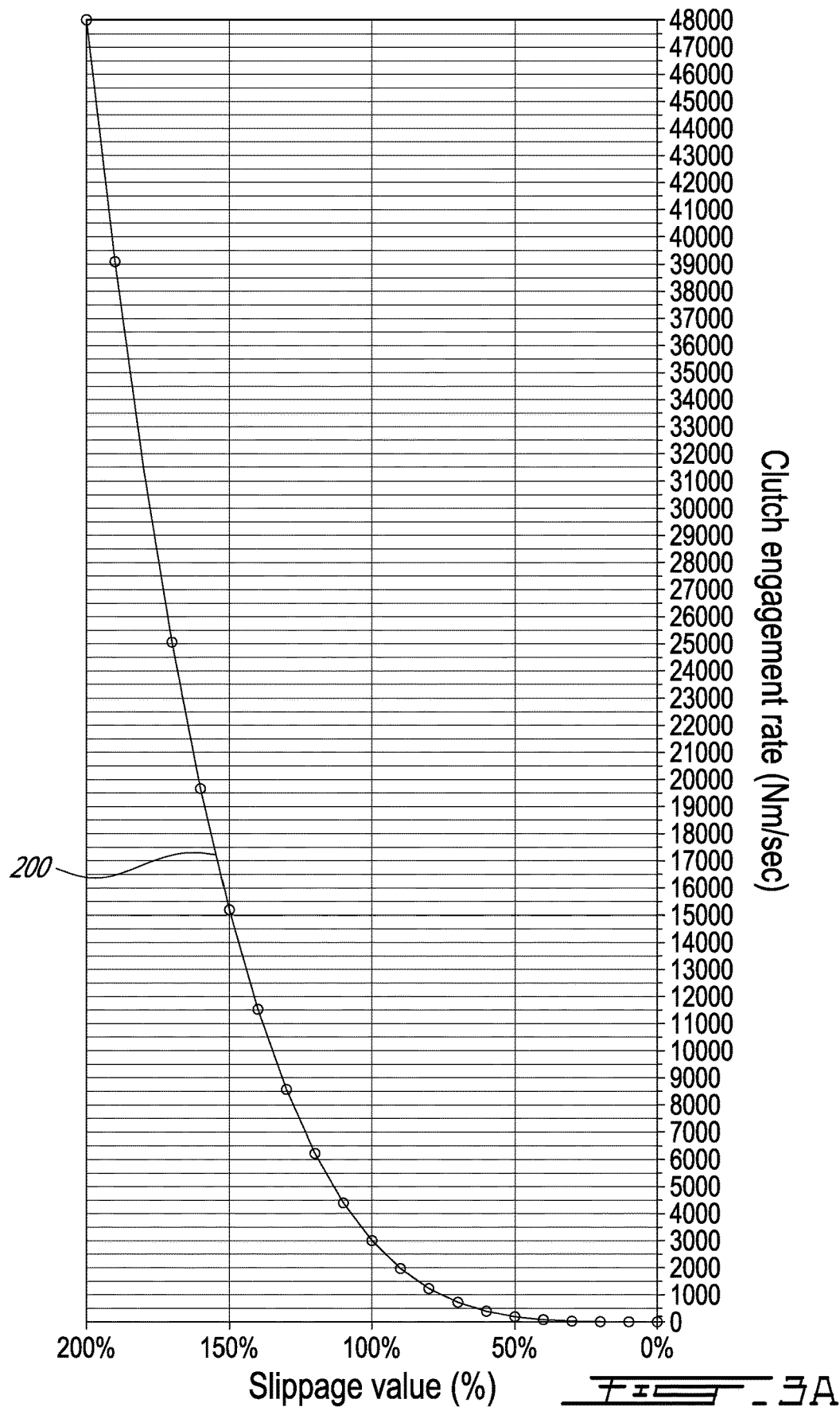

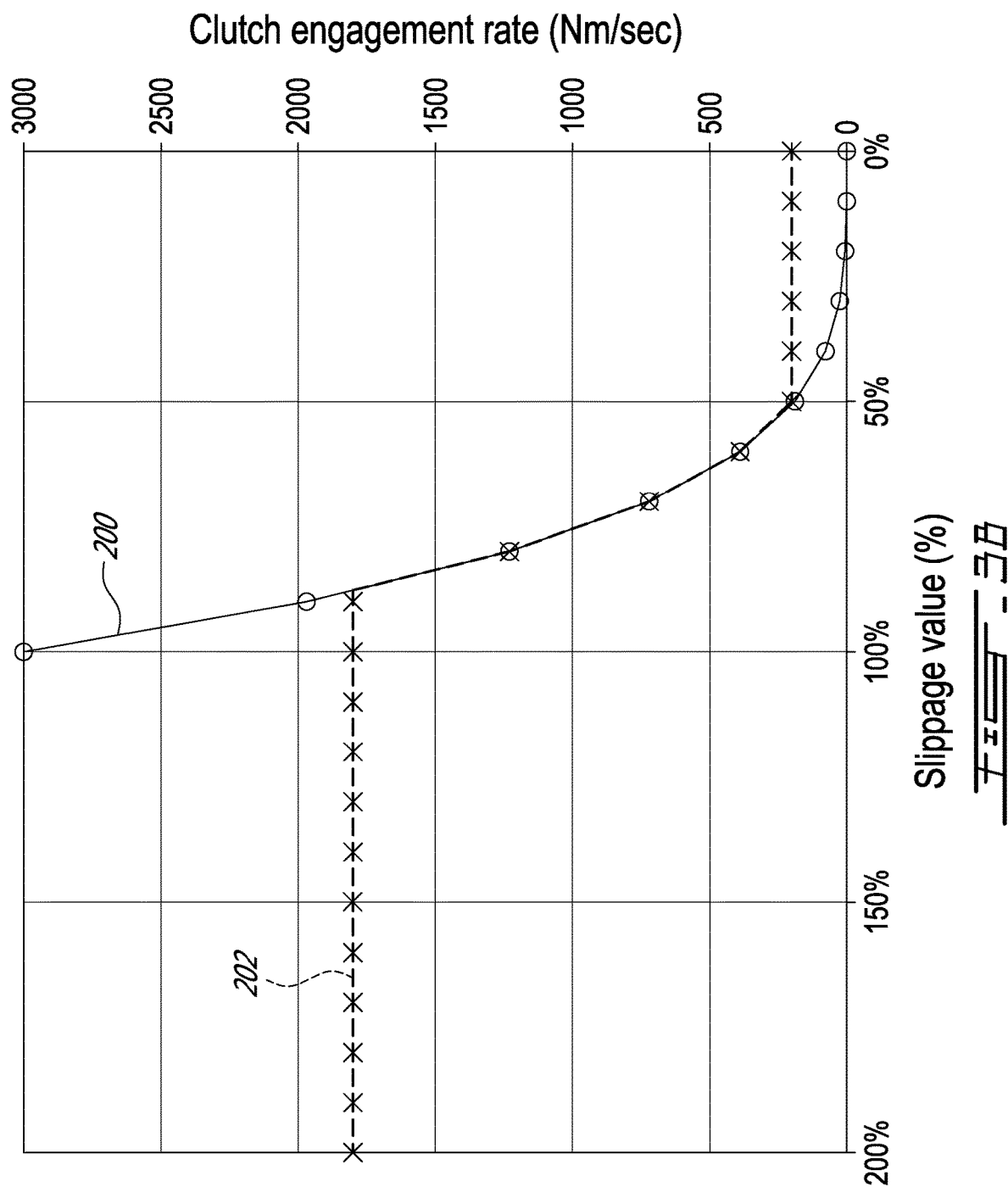

CONTROL OF THE ENGAGEMENT RATE OF A CLUTCH

FIELD

The present disclosure generally relates to clutches. More specifically, the present disclosure is concerned with the control of the engagement rate of a clutch present in the driveline of a vehicle.

BACKGROUND

In many conventional applications using clutches in the driveline of a vehicle, the engagement and disconnection of clutches are automatically controlled by a controller that engages the clutch at a generally constant rate. Often, a hydraulic or pneumatic arrangement is used to generate pressure in the clutch so that a movable disk is moved towards a fixed disk at a fixed rate.

In some drivelines, the clutch engagement rate may be adjusted in the controller upon assembly of the driveline but remains a fixed value afterwards.

BRIEF DESCRIPTION OF THE DRAWINGS

In the appended drawings:

FIG. 3A is a graph illustrating the clutch engagement rate with respect to the slipping percentage of the clutch; and FIG. 3B is an enlargement of a portion of FIG. 3A.

DETAILED DESCRIPTION

Figure 1:
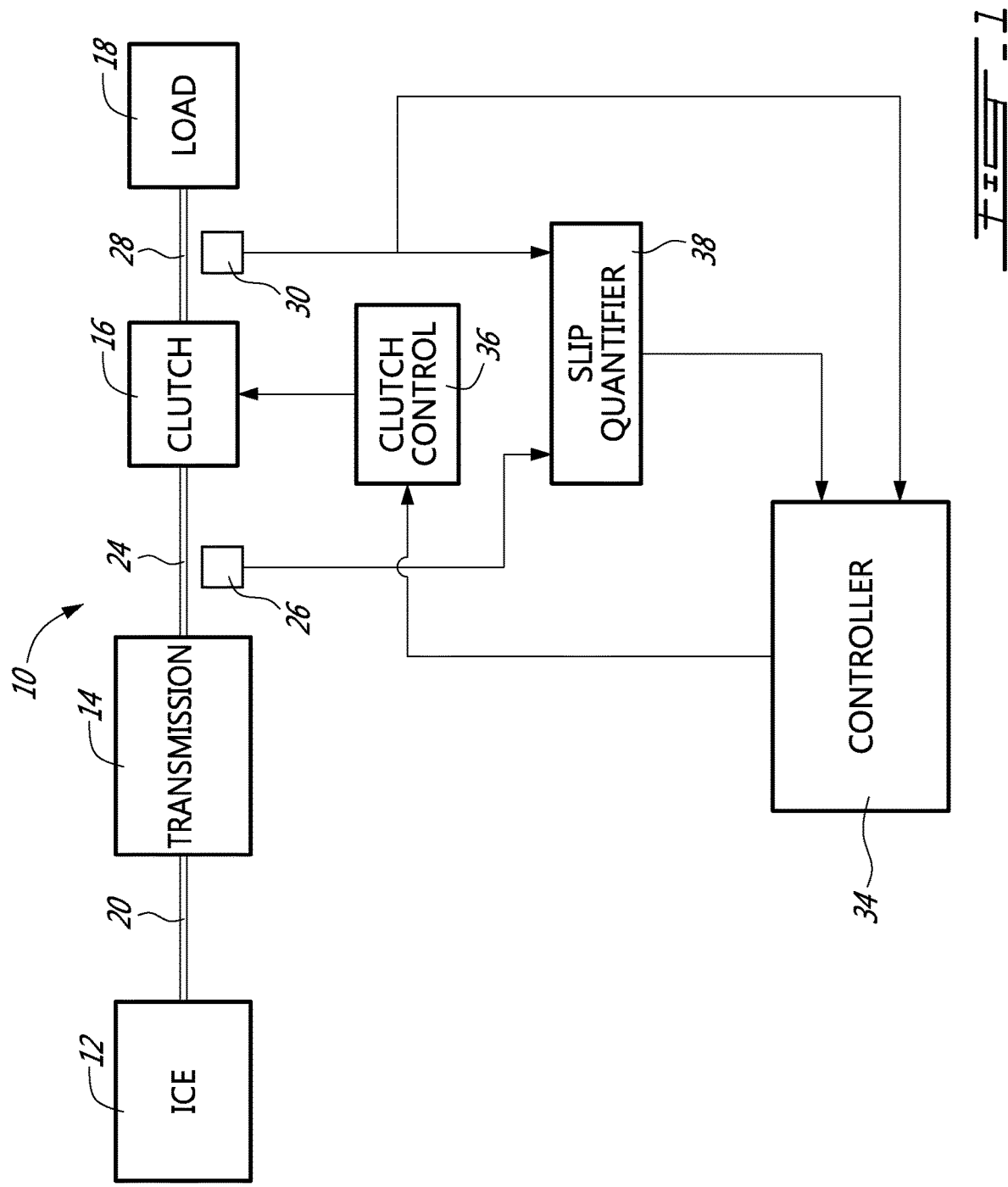
FIG. 1 is a block diagram of a driveline including a transmission and a clutch.

An object is generally to control the engagement rate of a clutch provided in a driveline.

According to an illustrative embodiment, there is provided a driveline for a vehicle, the driveline including a prime mover including an output; a transmission having an input connected to the output of the prime mover and an output; a clutch having an input connected to the output of the transmission and an output connectable to a load; a main controller; and a clutch controller so associated to the main controller as to receive a torque allowed to pass value and a clutch engagement rate therefrom; the clutch controller being so connected to the clutch as to control the clutch to reach the torque allowed to pass value at the clutch engagement rate. The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expression "connected" should be construed herein and in the appended claims broadly so as to include any cooperative or passive association between mechanical parts or components. For example, such parts may be assembled together by direct connection, or indirectly connected using further parts therebetween. The connection can also be remote, using for example a magnetic field or else.

It is to be noted that the expression "prime mover" is to be construed herein and in the appended claims as an internal combustion engine (ICE) a turbine engine, or any other mechanical power production element or assembly.

It will also be noted that the expressions "fixed disk", when used herein and in the appended claims in the context of clutch technology, may be viewed as any element or group of elements constituting a clutch driving member. Similarly, the expressions "movable disk", when used herein and in the appended claims in the context of clutch technology, may be viewed as any element or group of elements constituting a clutch driven member.

It is to be noted that the expression "off-highway vehicle" is to be construed herein and in the appended claims as any type of vehicle that is designed specifically for use off-road, including, amongst others, construction vehicles and agricultural vehicles.

Other objects, advantages and features of the control of the engagement rate of a clutch provided in a driveline will become more apparent upon reading of the following non-restrictive description of illustrative embodiments thereof, given by way of example only with reference to the accompanying drawings.

Before describing the features of a control of the engagement rate of a clutch provided in a driveline according to an illustrative embodiment, a driveline including a transmission and a slip arrangement will be briefly described.

More specifically, FIG. 1 of the appended drawings illustrate a driveline 10 comprising a prime mover in the form of an ICE 12, a transmission 14 and a clutch 16. The output of the clutch 16 is connected to a load 18.

A first shaft 20 interconnects the output of the ICE 12 and the input of the transmission 14. A second shaft 24 interconnects the output of the transmission 14 and the input of the clutch 16; the speed of the second shaft 24 is measured via a first speed sensor 26. A third shaft 28 interconnects the output of the clutch 16 and the load 18, for example, the wheels (not shown) of a vehicle; the speed of the third shaft 28 is measured via a second speed sensor 30.

Of course, one skilled in the art will understand that other mechanical elements (not shown) may be present between the output of the clutch 16 and the load 18. When this is the case, the second speed sensor 30 still measures the speed at the output of the clutch 16.

The driveline 10 includes a main controller 34 to which the speed sensor 30 is connected.

A clutch controller 36, connected to the main controller 34 and to the clutch 16, is so configured as to receive a usable torque value from the main controller 34 and to control the clutch 16 so as to slip when the torque attempting to pass through the clutch 16 is greater than this usable torque. The usable torque value may therefore be viewed as a torque allowed to pass through the clutch. In other words, the controller adjusts the pressure in the clutch so that, when the torque between the input and output of the clutch 16 is greater than the usable torque, the clutch 16 slips.

One skilled in the art will have no problem building such a clutch controller 36 adapted to the technology used in the clutch 16.

As an illustrative example, the pressure between the fixed and movable disks of the clutch 16, and therefore the torque allowed to pass therebetween, is controlled by hydraulic pressure and the clutch controller 36 includes a proportional pressure reducing/relieving valve (not shown) that may be controlled by the main controller 34.

The speed data from the first and second speed sensors 26 and 30 is supplied to a slip quantifier 38 that determines the slippage level of the clutch 16 by comparing data from the first and second speed sensors 26 and 30, in real time, and supply this slippage level data to the main controller 34.

As mentioned hereinabove, the clutch controller 36 includes a proportional pressure reducing/relieving valve that is controlled digitally to open and close. In the non-limiting illustrative driveline described herein, the clutch 16, connected to the clutch controller 36, can allow torque to pass therethrough in a range from zero to about 1500 Nm (Newton meter).

Accordingly, the clutch controller 36 is so configured that the torque allowed to pass through the clutch 16 may have any value from zero to the maximum value of 1500 Nm. The clutch controller 36 is also configured to receive, from the controller 34, a rate of change of the torque allowed to pass through the clutch from a current torque allowed to pass value to a new torque allowed to pass value. The unit of this rate of change is in Nm per second.

The main controller 34 receives data regarding the slippage level of the clutch from the slip quantifier 38 and receives the rotational speed at the output of the clutch 16 via the speed sensor 30.

In some applications, including off-highway vehicles, it may be interesting to dynamically vary the engagement rate of the clutch, i.e. the rate at which the movable disk moves towards the fixed disk of the clutch in Nm per second, depending on at least one parameter of the driveline. The parameters can be, as non-limiting examples, the slippage level of the clutch and/or the rotational speed at the output of the clutch.

Regarding the engagement rate of the clutch with respect to the speed at the output of the clutch 16, it is interesting, when the vehicle is travelling at relatively high speeds, to have a slow clutch engagement rate since the vehicle is already moving and there is no incentive to impose potential shocks on the driveline elements.

Conversely, when the vehicle is travelling at low speeds, it is interesting to have a fast clutch engagement since the need for a clutch engagement generally means that the operator wishes to increase the vehicle traveling speed. In other instances, for example when the vehicle is going slowly in an uphill slope while it is loaded, is may be interesting to engage the clutch in a timely manner to prevent unintended direction reversal and-or extended period of clutch slipping.

As a non-limiting example, the following formula can be used to calculate the clutch engagement rate with respect to the speed at the output of the clutch.

$$\text{Rate}_V = G_1 * (V_{ref}/V)^{e1} \quad \text{(Eq1)}$$

Where:

$\text{Rate}_V$: clutch engagement rate (in Nm per second) with respect to the output speed of the clutch;

$V_{ref}$: Reference rotational speed value at the output of the clutch (for example 1500 RPM);

V: Absolute value of the Instantaneous output speed of the clutch;

e1: Exponent factor (for example 1); and $G_1$: Gain factor (for example 500)

Figure 2:
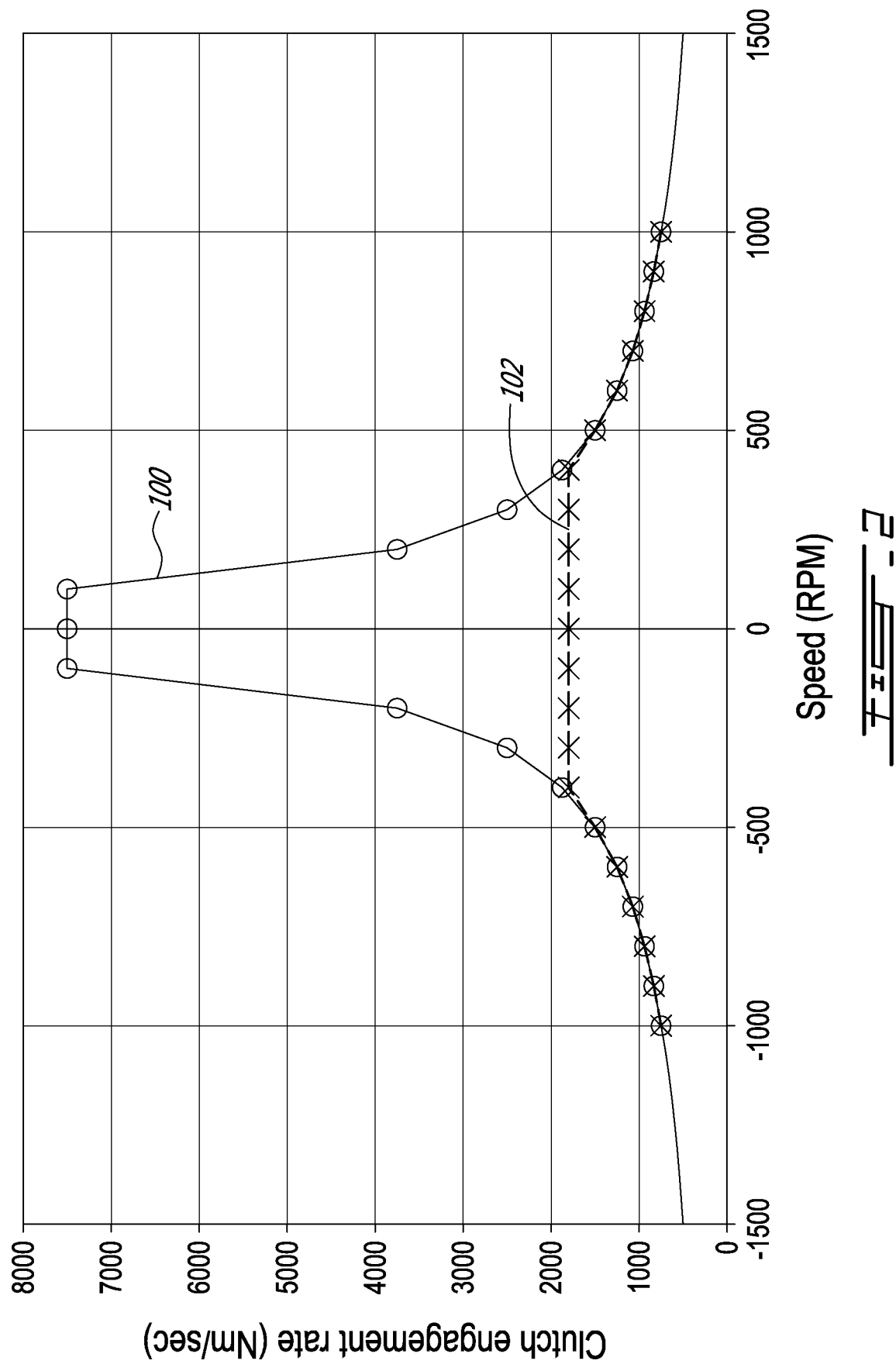
FIG. 2 is a graph illustrating the clutch engagement rate with respect to the rotational speed at the output of the clutch.

FIG. 2 of the appended drawings illustrates a graph of the $\text{Rate}_V$ with respect to the output speed of the clutch (see curve 100).

It has been found interesting to limit the maximal value of the clutch engagement rate at about 1800 Nm per second. Accordingly, curve 102 of FIG. 2 illustrates the result of the maximal limitation of the clutch engagement rate based on the speed at the output of the clutch.

While it is not applicable to the illustrative example described herein, with the illustrative values of the exponential and gain factors, it has been found interesting to limit the minimal value of the clutch engagement rate at about 200 Nm per second.

Regarding the engagement rate of the clutch with respect to the slippage level of the clutch, should the slippage level be small, it is interesting to have a slow clutch engagement rate since it generally means that the vehicle goes in the direction desired by the operator and that we are changing gears to increase or decrease the speed of the vehicle and that, to prevent unwanted shocks, which are generally bad for the mechanical components of the driveline and can negatively affect the driving feelings, the clutch engagement rate should be slow.

Conversely, when the slippage level is high (for example 100%), it is interesting to have a fast clutch engagement rate to yield a responsive transmission.

And when the slippage level is extremely high (for example 200%), meaning that the rotational direction of the drive and driven disks of the clutch are opposite but of about the same speed, it is interesting to have a fast clutch engagement rate since it means that the operator wants to change direction and that should be done quickly.

One skilled in the art will easily understand that the slippage level of the clutch is calculated as the speed at the input of the clutch minus the speed at the output of the clutch, divided by the speed at the input of the clutch, in other words (Vin−Vout)/Vin.

As a non-limiting example, the following formula can be used to calculate the clutch engagement rate with respect to the slippage level of the clutch.

$$\text{Rate}_S = G_2 * S^{e2} \quad \text{(Eq2)}$$

Where:

$\text{Rate}_S$: Clutch engagement rate (in Nm per second) with respect to the slippage level of the clutch $G_2$: Gain factor (for example 3000)

S: slippage level of the clutch (in %)

e2: exponent factor (for example, 4)

FIG. 3A of the appended drawings illustrates the clutch engagement rate ($\text{Rate}_S$) with respect to the slippage level of the clutch as calculated using Eq2 hereinabove.

FIG. 3B illustrate a portion of FIG. 3A showing the clutch engagement rate of 3000 Nm per second and less (see curve 200).

Again, it has been found interesting to limit the maximal value of the clutch engagement rate at about 1800 Nm per second. Furthermore, it has been found interesting to limit the minimal value of the clutch engagement rate to about 200 Nm per second. Accordingly, curve 202 of FIG. 3B illustrates the result of the maximal and minimal limitations of the clutch engagement rate based on the slippage level of the clutch.

As it will easily be understood by one skilled in the art, the general equations Eq1 and Eq2 hereinabove have been determined empirically with the above described goals in mind and these equations (and/or their Gain and Exponent factors) can be changed depending on the specific application and/or the desired driveline behaviour.

As mentioned hereinabove, it has been found interesting to provide minimal and maximal rates for the clutch engagement rate. Indeed, there is a maximal limit to the speed at which the pressure can build in the clutch before doing mechanical damage or potentially generating unwanted shocks. There is therefore a maximal limit to the engagement rate of the clutch.

Regarding the minimal clutch engagement rate, it has been found interesting to provide a lower limit at which the clutch engages to make sure the clutch is engaged completely in a timely manner and that the duration of the slipping of the clutch is limited.

As will be understood by one skilled in the art, in some cases the two rules pertaining to the clutch engagement rate with respect to the speed and to the slippage level cannot be satisfied. It has therefore been determined that, in any case in the non-limiting example described herein, the lesser of these two calculated clutch engagement rates (Rate$_V$ and Rate$_S$) is used.

The controller 34 therefore calculates the Rate$_V$ and Rate$_S$ at a predetermined frequency and supplies the lesser engagement rate to the clutch controller 36.

One skilled in the art will understand that while the main controller 34, the clutch controller 36 and the slip quantifier 38 are shown as separated elements in FIG. 1, these elements could be integral.

It is to be understood that the control of the engagement rate of a clutch is not limited in its application to the details of construction and parts illustrated in the accompanying drawings and described hereinabove. The control of the engagement rate of a clutch is capable of other embodiments and of being practiced in various ways. It is also to be understood that the phraseology or terminology used herein is for the purpose of description and not limitation. Hence, although the control of the engagement rate of a clutch has been described hereinabove by way of illustrative embodiments thereof, it can be modified, without departing from the spirit, scope and nature thereof.

What is claimed is:

1. A driveline for a vehicle, comprising:
   a prime mover including an output;
   a transmission having an input connected to the output of the prime mover and an output;
   a clutch having an input connected to the output of the transmission and an output connectable to a load;
   an arrangement quantifying the slippage level between the input and the output of the clutch;
   a further arrangement quantifying the rotational speed at the output of the clutch;
   a main controller configured to calculate a first clutch engagement rate as a function of the slippage level of the clutch and a second clutch engagement rate as a function of the rotational speed at the output of the clutch, the main controller selecting the lowest clutch engagement rate; and
   a clutch controller so associated to the main controller as to receive a torque allowed to pass value and the lowest clutch engagement rate therefrom; the clutch controller being so connected to the clutch as to control the clutch to reach the torque allowed to pass value at the lowest clutch engagement rate.

2. The driveline as recited in claim 1, wherein the clutch controller and the main controller are integral.

3. The driveline as recited in claim 1, wherein the slippage quantifying arrangement includes first and second speed sensors respectively measuring the rotational speed of the input and of the output of the clutch; the first and second speed sensors supplying speed data to a slip quantifier so configured as to quantify the slippage level and to supply the slippage level data to the main controller.

4. The driveline as recited in claim 3, wherein the slip quantifier, the main controller and the clutch controller are integral.

5. The driveline as recited in claim 1, wherein the main controller uses the following function to calculate the clutch engagement rate:

$$\text{Rate}_S = G_2 * S^{e2}$$

where Rate$_S$ is the clutch engagement rate (in Nm per second) with respect to the slippage level of the clutch; $G_2$ is a gain factor; S is the slippage level of the clutch (in %); and e2 is exponent factor.

6. The driveline as recited in claim 1, wherein the main controller uses the following function to calculate the clutch engagement rate:

$$\text{Rate}_V = G_1 * (V_{ref}/V)^{e1}$$

where: Rate$_V$ is the clutch engagement rate with respect to the output speed of the clutch; $V_{ref}$ is a reference rotational speed value at the output of the clutch; V is an absolute value of the rotational speed at the output of the clutch; e1 is an exponent factor; and $G_1$ is a gain factor.

7. The driveline as recited in claim 1, wherein the further arrangement includes a speed sensor.

* * * * *